Jan. 29, 1963

G. F. RADEMACHER 3,075,387

HEAT-SENSING DEVICE

Filed March 18, 1960

INVENTOR.
Gustav F. Rademacher
BY
Paul J. Reising
ATTORNEY

United States Patent Office 3,075,387
Patented Jan. 29, 1963

3,075,387
HEAT-SENSING DEVICE
Gustav F. Rademacher, Flint, Mich., assignor to General Motors Corporation, Detroit, Mich., a corporation of Delaware
Filed Mar. 18, 1960, Ser. No. 16,054
3 Claims. (Cl. 73—359)

This invention relates to a heat-sensing device useful for the measurement of temperatures in gas turbine engines and more particularly to a thermocouple, i.e., a device having a heat-sensitive junction of two dissimilar metals productive of an E.M.F. which is proportional to temperature. The invention has as one of its objects the provision of an improved thermocouple for the measurement of the temperature of a moving fluid, which is characterized by a greatly improved rate of response to a change in temperature. Another object is to provide a thermocouple particularly suited for aircraft gas turbine engines and having an improved shell structure which greatly increases the response rate.

In accordance with the invention, these objects are accomplished by the provision of a thermocouple which incorporates means responsive to flow of gas through the engine for increasing the mass flow rate of gas adjacent the heat-sensitive element. More specifically, in accordance with the invention the heat-sensitive element is positioned within a casing which has gas inlet and outlet openings to direct a portion of the stream of gas to be measured adjacent and around the heat-sensitive element, and which creates a reduced pressure at the outlet to thereby cause a suction effect with the result that the mass flow rate of gas through the casing is increased. With this increase in the mass flow rate of the gas through the device, there is a commensurate increase in the speed of response of the thermocouple to a change in temperature of the gas.

These and other features and advantages of the invention will appear more clearly from the following detailed description of preferred embodiments thereof made with reference to the appended drawings in which.

Figure 1:
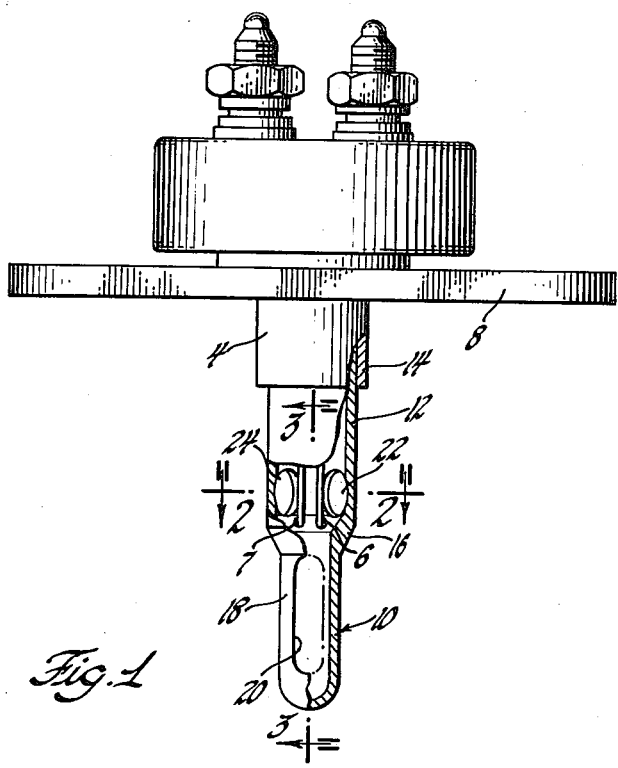
FIGURE 1 is a side view in partial section of a thermocouple constructed in accordance with the invention.

Referring now to FIGURE 1, the thermocouple shown comprises a metal shell 4 having secured therein as heat-sensitive elements two sets of thermocouple wires electrically insulated from the shell and from each other and with lower ends joined to form two heat-sensitive junctions 6 and 7. Two heat-sensitive elements rather than only one are used merely to add reliability; in case one element should fail, the device will still operate. A suitable mounting pad 8 is provided for securement of the thermocouple into the combustion chamber wall of a gas turbine engine. The wires may be of any suitable dissimilar metals; for example, one wire of each set can be of Chromel (90% nickel and 10% chromium) and the other of Alumel (95% nickel and the remainder aluminum, silicon and manganese), as well known in the art. Each of the thermocouple wires has its own terminal to which it is electrically connected at the top of the shell 4. The precise structure of the upper part of the shell and the structure for mounting the heat-sensitive elements in the shell form no part of the present invention and may, if desired, be that shown in my United States Patent 2,888,508, issued May 26, 1959.

The lower end of the shell is formed by a cylindrical shaped tubular member 10 which forms a housing surrounding but spaced from the heat-sensitive element. This tubular member has an upper portion 12 of enlarged diameter the top end of which is telescoped within and welded to the shell portion 14, a tapered intermediate portion 16, and a lower end portion 18 of reduced diameter. The lower end portion is provided with a gas inlet opening 20 which in the embodiment shown is of elongated shape, and the upper enlarged portion 12 is formed with two gas outlet openings 22 and 24 each having its center oriented at approximately 120° from the center of the inlet opening, the heat-sensitive junctions being located between the inlet and outlet openings. The combined area of the outlet openings should be at least as great as that of the inlet opening; if desired only a single outlet opening may be used, but it should be of such size that its area is at least equal to and preferably somewhat greater than that of the inlet.

Figure 2:
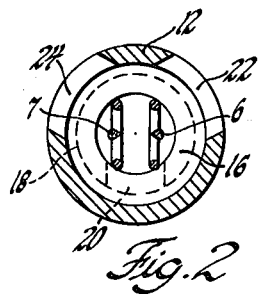
FIGURE 2 is a view taken on the line 2—2 of FIGURE 1.
Figure 3:
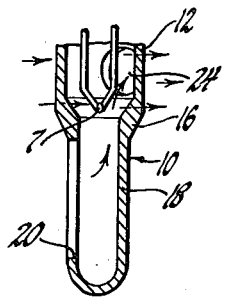
FIGURE 3 is a view of the lower portion of the thermocouple shown in FIGURE 1 and illustrates its orientation with respect to the direction of flow of the gas in the engine in which it is mounted.

As can be best seen in FIGURE 2, each of the outlet openings is located with an edge thereof on the centerline of the cylindrical housing and the inlet opening is located such that its center is oriented at about 90° from the centerline. The thermocouple is mounted in the gas turbine engine such that the inlet and outlet openings are arranged as shown in FIGURE 3, with the inlet opening facing into the gas stream and with the outlets facing generally laterally and rearwardly. Hence, when mounted, the plane of the inlet opening is disposed approximately perpendicular to the axis of the gas stream and the plane of each outlet opening is disposed at an angle to said axis, the leading or upstream edge of each outlet opening being located at that point on the wall portion of the housing in which it is located which is of maximum lateral displacement from the longitudinal axis of that portion of the housing. With the housing so constructed, the force of the gas stream rams a sample stream of the gas into the inlet opening, and the gas stream passing around the exterior of the housing creates a low pressure at the outlet openings such that there is a suction effect. This increases the mass flow rate of gas through the housing and around the heat-sensitive elements 6 and 7 to the extent that the mass flow rate, per unit cross-sectional area, through the housing is greater than that of the stream passing around the housing. With this increase in mass flow rate there is a commensurate increase in the speed of response of the thermocouple to any change in gas temperature. By locating the outlet openings as indicated, to face generally laterally and rearwardly, there is a maximum suction created by the gas stream passing around the casing with no ram effect and little turbulence tending to cause the gas to enter the outlets.

Particularly where the thermocouple is designed for use in engines wherein at high engine speeds the gas stream will move at supersonic speeds, it is advantageous to locate the heat-sensitive element in or closely adjacent the small diameter portion of the housing so that the generally annular shaped passage between the heat-sensitive element and the housing is somewhat restricted. At low engine speeds the restricted clearance will have little effect on the mass flow rate; however, at high engine speeds it will exhibit a sufficient blocking effect to reduce the flow rate to below supersonic speed. This is important because if the gas were allowed to move through the housing at supersonic speeds, the speed itself of the gas would cause a heating effect on the heat-sensitive junction and hence give rise to false readings.

If desired, the shape of the housing may be other than cylindrical though in all instances it is desirable that it be of streamlined shape such that it does not present excessive resistance to the flow of gas through the engine. But from the standpoint of attaining small resistance to flow together with relatively low manufacturing costs, a cylindrical shaped housing, as shown, is preferred. Also, any number of inlet and outlet openings may be used though in all instances their location should be in accordance with the above so as to attain a ram effect at the inlets and a suction effect at the outlets.

Figure 4:
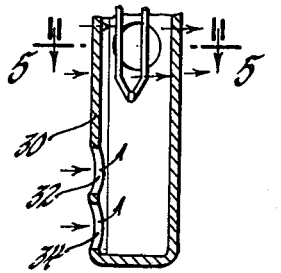
FIGURE 4 is a view like that of FIGURE 3, but of another embodiment of the invention.
Figure 5:
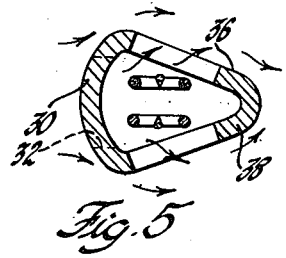
FIGURE 5 is a view taken on the line 5—5 of FIGURE 4.
Figure 6:
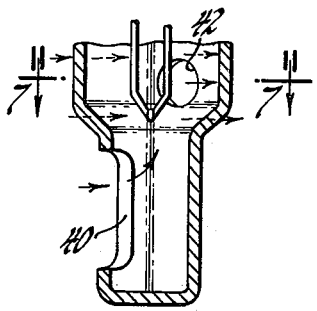
FIGURE 6 is a view like that of FIGURE 3, but of still another embodiment of the invention.
Figure 7:
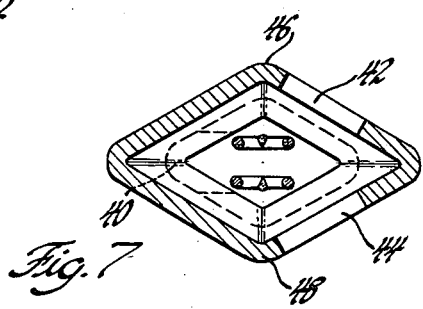
FIGURE 7 is a view taken on the line 7—7 of FIGURE 6.

FIGURES 4 and 5 show an embodiment of the invention wherein the housing has a cylindrical front surface 30 with a plurality of round inlet openings 32 and 34, and converging flat side walls 36 and 38 which extend rearwardly and inwardly. Each side wall has an outlet opening with its leading edge adjacent the junction of the flat side wall with the cylindrical front surface. In the embodiment shown in FIGURES 6 and 7 the housing is diamond-shaped with an inlet 40 and outlets 42 and 44 which face generally rearwardly and laterally with their leading edges at the corners 46 and 48, respectively, which constitute the points on the housing wall which are of maximum lateral displacement from the housing's longitudinal axis. This diamond-shaped housing structure is particularly suited for use in jet engines in which the gas stream moves at supersonic speeds.

The remaining portions of the thermocouple shown in FIGURES 4 and 5, and 6 and 7, may be the same as that shown in FIGURE 1.

I am aware that it is old in the thermocouple art to incorporate a housing around the heat-sensitive element with inlet and outlet openings to direct hot gas against the heat-sensitive element. Such structure is shown, for example, by my aforesaid Patent 2,888,508 and has been uesd for the purpose of directing to the junction a larger and therefore more representative gas sample than would contact the junction if no housing at all were used. However, these prior housings have no effect of increasing the response rate but, instead, have an opposite effect because, as I discovered, they tend to decrease the mass flow rate of gas adjacent the heat-sensitive element. This results from the ararngement of the outlets in areas of high turbulence, the turbulence creating a blocking effect on the passage of gas. As distinguished from this, the present invention not only accomplishes excellent gas sampling but in addition provides a significantly increased response rate by way of the increased mass flow rate of gas adjacent the heat-sensitive junction.

It will be understood that while the invention has been described with reference to particular embodiments thereof, changes and modifications may be made, all within the full and intended scope of the claims which follow.

I claim:

1. A thermocouple for gas turbine engines to measure the temperature of the exhaust gas stream flowing therethrough comprising a thin walled generally tubular shaped housing with a lower end portion of relatively small cross sectional area having at least one inlet opening therein and with an upper portion of relatively large cross sectional area having at least one outlet opening therein, and a heat-sensitive junction of dissimilar metals positioned within said housing adjacent the junction of said upper and lower housing portions, said inlet opening being arranged to face into said gas stream with its plane approximately perpendicular to the axis of the gas stream and said outlet opening being arranged to face generally laterally and rearwardly of said inlet opening with its leading edge adjacent that point on the wall portion of the housing in which it is located which is of maximum lateral displacement from the longitudinal axis of that portion of the housing.

2. A thermocouple for gas turbine engines to measure the temperature of the exhaust gas stream passing therethrough comprising a thin walled generally cylindrical shaped housing having at least one inlet opening and having a pair of outlet openings axially spaced from said inlet opening, and a heat-sensitive junction of dissimilar metals positioned within said housing between said inlet and said outlet openings, said inlet opening being arranged to face into said gas stream with its plane approximately perpendicular to the axis of the gas stream and each of said outlet openings being arranged to face generally laterally and rearwardly of said inlet opening with its leading edge oriented at about 90° from the center of the inlet opening.

3. A thermocouple for gas turbine engines to measure the temperature of the exhaust gas stream passing therethrough comprising a thin walled generally cylindrical shaped housing with a lower portion of relatively small diameter having an elongated gas inlet opening aligned with the longitudinal axis of said housing and with an upper portion of relatively large diameter having a pair of gas outlet openings therein, and a heat-sensitive junction of dissimilar metals positioned within said housing adjacent the junction of said upper and lower housing portions, the leading edge of each of said outlet openings being oriented at about 90° from the longitudinal axis of said elongated inlet opening.

References Cited in the file of this patent

UNITED STATES PATENTS

| 734,702 | Marsden | Aug. 3, 1955 |
| 2,888,508 | Rademacher | May 26, 1959 |